United States Patent [19]

Leverberg et al.

[11] 4,367,888
[45] Jan. 11, 1983

[54] PLUG COUPLER FOR SEVERAL HOSE CONNECTIONS

[76] Inventors: Siegfried Leverberg, Bremenkampstrasse 77, D-4200 Oberhausen 14; Manfred Hofmann, Geleitstrasse 17, D-6053 Obertshausen; Helmuth Hoffmann, Albert-Einstein-Strasse 5, D-5060 Bergisch Gladbach 1, all of Fed. Rep. of Germany

[21] Appl. No.: 154,013

[22] Filed: May 28, 1980

[30] Foreign Application Priority Data

May 31, 1979 [DE] Fed. Rep. of Germany ....... 2922186

[51] Int. Cl.³ .............................................. F16L 39/02
[52] U.S. Cl. .................................. 285/28; 285/137 R
[58] Field of Search ......................... 285/137 R, 28, 25

[56] References Cited

U.S. PATENT DOCUMENTS

| 2,849,960 | 9/1958 | Olmstead et al. | 285/363 X |
| 3,214,195 | 10/1965 | Zahuranec et al. | 285/137 R X |
| 3,229,656 | 1/1966 | Bodey | 285/137 R X |
| 3,305,249 | 2/1967 | Zahuranec | 285/137 R X |
| 3,326,579 | 6/1967 | Fowler | 285/137 R X |
| 3,406,989 | 10/1968 | Gross | 285/137 R |
| 4,149,567 | 4/1979 | Weirich | 285/137 R X |
| 4,198,076 | 4/1980 | Mezei | 285/18 |
| 4,247,135 | 1/1981 | Weirich et al. | 285/137 R |

FOREIGN PATENT DOCUMENTS

| 1962884 | 7/1970 | Fed. Rep. of Germany ... 285/137 R |
| 1197447 | 7/1970 | United Kingdom ........... 285/137 R |

Primary Examiner—Thomas F. Callaghan
Attorney, Agent, or Firm—Schwartz, Jeffery, Schwaab, Mack, Blumenthal & Koch

[57] ABSTRACT

A hose coupling device for multiple hose connections having a tightly fitted hose fitting comprises a plug portion, hose fitting means hose fitting pins and a socket portion consisting of a flange adaptor section and a spacer section. The flange adaptor section comprises a flange adaptor means having a plurality of bores, a releasable plate means connected to the flange adaptor means with a clamping bolt having a central bore receiving a guide pin means. The spacer section comprises a shell means with a plurality of bores for registering with the flange adaptor section bores and means connecting the spacer section bores to the releasable plate means.

11 Claims, 6 Drawing Figures

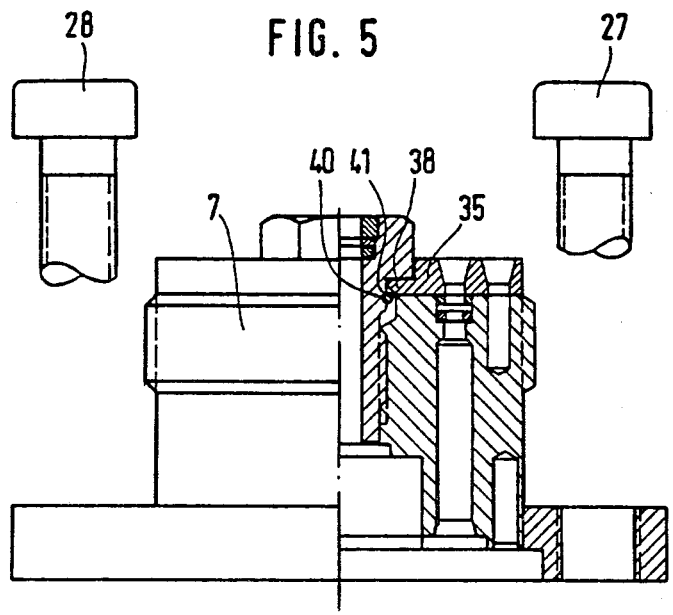
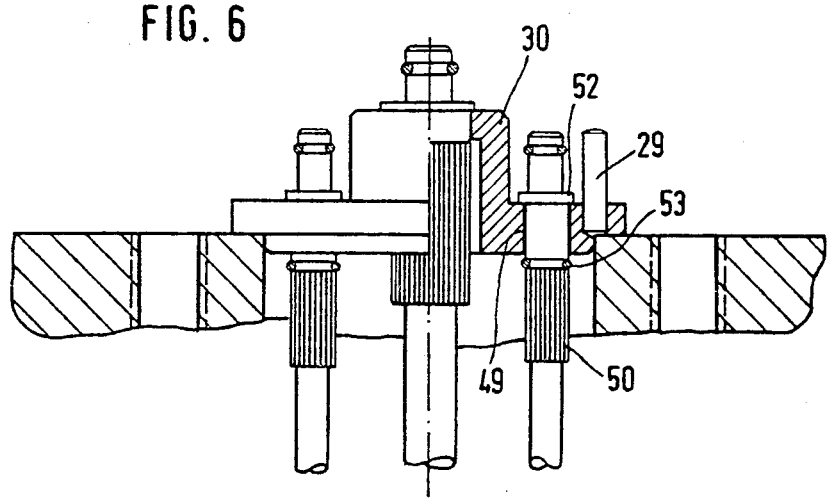

PLUG COUPLER FOR SEVERAL HOSE CONNECTIONS

FIELD OF THE INVENTION

The invention concerns a plug coupler for several hose connections with tightly fitted hose fittings, in particular for pilot control lines under alternating and selective atmospheric pressure and high pressure. The coupler consists of several 100 bar overpressure, consisting of a plug piece and a socket piece, wherein the socket piece is provided with a flange adapter piece with appropriate bores to accommodate the guide and hose fitting pins of the plug piece. In addition, in each bore for the holding of a gasket, a groove accessible by means of a releasable plate is provided and the flange adapter part of the socket piece with the releasable plate is equipped with a central bore to receive a clamping bolt and the releasable plate is fastened to the flange adapter part by means of two locating pins and the clamping bolt.

BACKGROUND OF THE INVENTION

Hose connections for pilot control lines are used for example, to control construction machines exposed to severe operating conditions. This is especially true for underground building operations, because the operating conditions prevailing therein pose the highest requirements. For example, when control installations or working machines change their locations, it is necessary to interrupt existing hose connections, wherein plug couplers are used.

Pilot control lines, in particular, have very small cross sections with diameters, for example, of 1.8 mm, whereby the hydraulic medium is exposed to pressures of, for example, 500 bar. The plug pins of the fittings of the pilot control lines are, therefore, extremely sensitive and in order to obtain secure plug contacts, the sealing elements are subject to very high requirements. Furthermore, it is necessary to couple simultaneously a large number of pilot control lines, so that their location in the socket piece and the arrangement and dimensioning of the bores in the socket piece must be effected with the utmost accuracy and simple and rapid coupling without damaging the plug pins and particularly, their seals must be assured.

It is further necessary to provide simple measures for the rapid and safe replacement of sealing elements.

In order to solve the problem of the ready installation and dismantling of the seals, it is known to manufacture a socket piece in two parts, i.e., a structural base part equipped with bores and a plate provided with corresponding bores, this plate being bolted to the base part. The bores of the base part are provided with grooves so that they are readily accessible for the installation of seals when the plate is released.

The manufacturing basis for the tolerances of the pitch circle bores is DIN (Deutsche Industrie Norm: German Industrial Standard) 7168, which yields a sealing gap in the radial direction of 0.8 mm, with an assumed bore diameter of 3.4 mm.

Such a sealing gap is unsuited for important applications of plug couplers, because under the pressure being applied, the seals are driven into the gap and thus destroyed. Similarly, in the coupling process, the misalignment of the bores between the plate and the base part leads to the rapid destruction of the seals.

To reduce such manufacturing tolerances, it is further known to clamp together the base part with the plate during the production of the correctly aligned bores by means of locating pins and then to drill the bores together. In order to clamp the parts together and to safely secure them against each other, it is necessary, however, to overdimension the locating pins, so that they can no longer be separated without special auxiliary means. This, in turn, is in contradiction to the requirement of the rapid and simple replacement of seals.

In order to prevent the destruction of seals and to reduce wear during the plugging process, it is further necessary to avoid damage to the plug-in pins of the nose fittings during the insertion process, because the grooves being formed may injure the seals, so that at the high pressures required, the plug coupling may become unusable.

OBJECTIONS OF THE INVENTION

It is, therefore, the object of the invention to provide a plug coupler for several hose connections with extremely tight hose connections for very high pressures, in particular, for pilot control lines, capable of rapid and secure coupling under severe operating conditions without damaging the sensitive plug pins of the fittings, while assuring the rapid and simple replacement of the sealing elements, without sacrificing extremely narrow clearances and very tight fits.

In accordance with the invention the above-described plug coupling is attained equipping the center bore of the releasable plate with a projection preferably having a shoulder, against which a retaining ring located in a fillet of the clamping bolt is urged during the outward screwing of the clamping bolt.

The clamping bolt is preferably provided with an inner bore to receive a central guide pin designed as the median stud with the longest effective length of the plug part. According to the invention, the flange adapter part of the socket piece is connected with the releasable plate by means of two overdimensioned locating pins.

It is preferred that, the releasable plate be equipped with bores of the flange adapter part and the bores in the releasable plate be of a conical configuration for the introduction of the pins of the hose fittings. It is also preferred that the entrance of each corresponding bore in the flange adapter part be provided with an expanded groove to receive an O-ring and that the sections of the bore before and after the expanded groove have identical diameters and be exactly cylindrical and be located identically with respect to a common central axis, not shown.

To receive a guide pin of median effective length, the releasable plate and the flange adapter part are preferably provided with an eccentrically located bore each.

Preferably, the internal bore of the clamping contains a pressure resistant seal and a center median lug designed both as a guide pin and as a pin of the hose fitting.

In spite of the presence of oversize locating pins, the coupler according to the invention insures the ready release of the plate, so that the grooves for the installation of the gaskets thereby become easily accessible. It is possible with the aid of these characteristics to obtain extremely close clearances and very tight fits, without impairing the overriding requirement of easy releasability and without the use of additional tools.

By virtue of the fact that the clamping bolt is provided with an internal bore to receive the central guide pin, the safe insertion and protection of the hose fitting pins are assured. The protection of the hose fitting pins against mechanical damage is the first precondition of the prevention of injury to the seals during the plug-in process by damaged hose fitting pins. In order, therefore, to insure the initiation of an insertion process even under severe operating conditions, such as those prevailing for example in underground construction work, the clamping bolt is provided with an internal bore capable of receiving a central guide pin, designed as the median lug with the longest effective length has, on the front side in the direction of the socket piece, a reduced insertion diameter with a plug-in cone and is of a stable configuration so that damage thereto is nearly impossible. The median lug is furthermore especially suitable for the initiation of the insertion process. Because the releasable plate and the flange adapter part both contain eccentrially arranged bores for the receiption of a guide pin of median effective length, merely a relative rotation of the plug or the socket part is required to cause the eccentrically located guide pin to reach the bore assigned to it. As the plug-in pins are shorter, injury during this process of rotation is excluded, because the plug-in pins are in a protected position. When the guide pin of median effective length reaches the bore in the releasable plate assigned to it, the accurate alignment of the plug piece with the socket piece is obtained, so that the concluding plug-in process may be effected. The flange adapter part of the socket piece is further provided with external threads fitting the internal threads of the sleeve nut of the plug part, so that the plug piece may be securely screwed together with the socket piece, following the mutual insertion, in correct alignment with the corresponding guide and fitting pins.

Since the guide pin with the longest effective length of the socket piece is simultaneously designed as a fitting for the center hose and arranged in the center of the socket piece, the center hose associated with it may simultaneously assume the function of the return hose, whereby it is possible to make said center hose larger.

The invention is explained in more detail with the aid of a drawing representing an example of embodiment.

BRIEF DESCRIPTION OF THE DRAWINGS

FIG. 5 a corresponding representation of the socket piece in the dismantled state;
FIG. 6 the lower part of the socket piece with the spacer shell to hold the hose connection fittings.

DETAILED DESCRIPTION OF THE INVENTION

Figure 1:
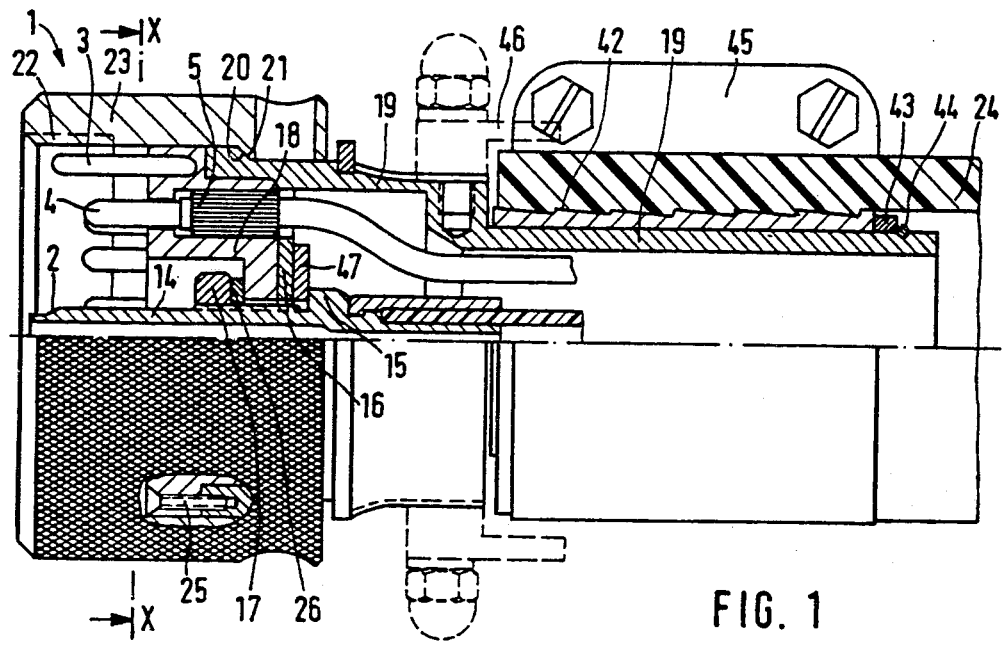
FIG. 1 is a view of the plug part in partial section.

In FIG. 1 the plug piece is represented in partial section wherein several pilot control hoses with their fittings 5 and the associated plug pins 4 are in the protective hose 24. The guide pin 2 simultaneously also represents the fitting 14 of a return hose. The fitting 14 is provided with a stop 15 against which a star disk 16 is resting, said disk 16 in turn acting to adjust the fittings 5 of the pilot control hoses. The star disk 16 is stressed by way of a disk 47 by means of the nut 17 located on the external threading of the armature 14 on a support element 18. The support element 18 has bores to receive and hold the hose fittings 5 which thereby are secured on the one hand by the star disk 16 against sliding in the downward direction and on the other occupy a secure seat in the bores of the support element 18. The star disk 16 and the support element 18 are further arranged in a sleeve 19 being provided in its forward part with an external shoulder 20 against which an internal shoulder 21 of a cap nut 23 equipped with an internal threading 22 is resting in the connected state of the coupling. In the lower part of the sleeve 19 a keyed part 42 is mounted in a rotating manner, said part 42 being secured in position by a step 43 and a lock washer 44. The protective hose 24 is slid over the keyed part 42 and clamped together with the keyed part 42 by means of the sleeve 45. The sleeve 45 cooperates with a stop 46, which limits the relative rotational displacement between the sleeve 19 and the protective hose 24.

The support element 18 is further provided with a bore to receive the median guide pin 3, which in relation to its effective length is located between the effective length of the guide pin 2 designed as the center pin and the effective length of the pins 4 of the hose fittings 5. "Effective length" is defined herein as the maximum attainable depth of insertion of each pin. The absolute length of each pin is independent of this effective length.

The bolts 25 connect the support element 18 with the sleeve 19 to form a solid unit and between the clamp nut 17 and the support element 18 there is the washer 26.

Figure 2:
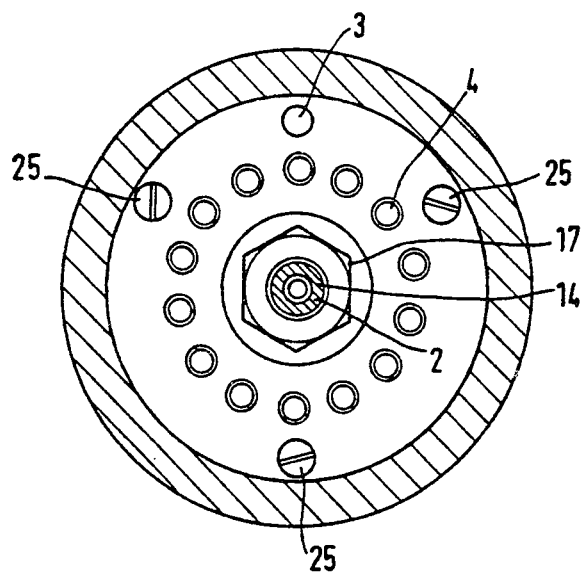
FIG. 2 shows a section X with respect to FIG. 1.

FIG. 2 shows a section X wherein identical elements are designated by identical reference symbols.

Figure 3:
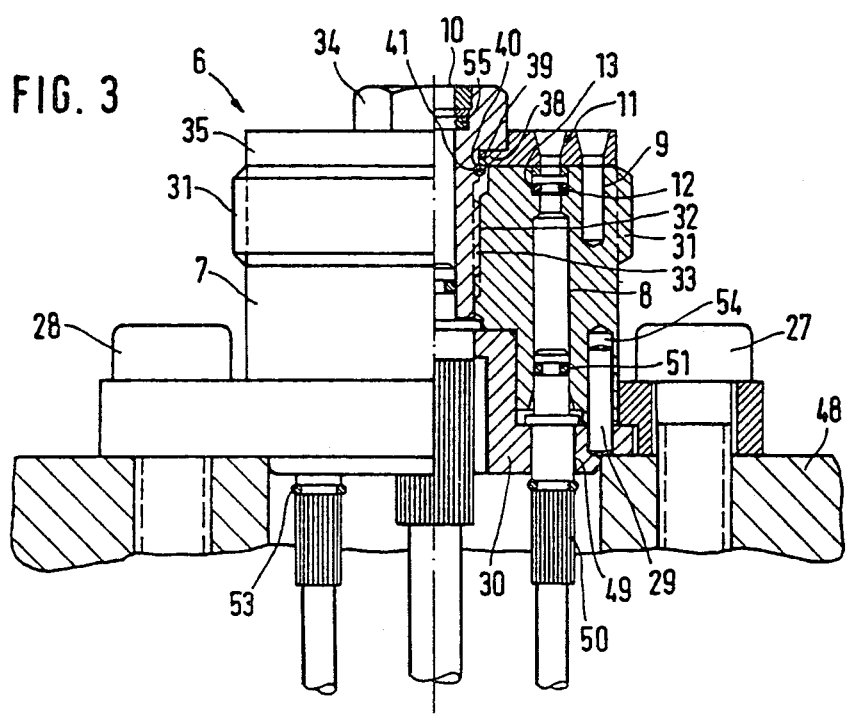
FIG. 3 shows a lateral elevation of a socket piece in partial section.

FIG. 3 shows the socket part 6 in a side elevation and in a partial section. The principal elements of the socket part comprise a releasable plate 35, the flange adapter part 7 located beneath the said plate 35 and a spacer shell 30 which is pinned to the flange adapter part 7 by means of a locating pin 29 and fastened to a housing plate 48 by means of the threaded bolts 27 and 28. The flange adapter part 7 of the socket part 6 has an external threading 31 fitting the internal threading 22 of the cap nut 23 shown in FIG. 1. The flange adapter part 7 and correspondingly, the releasable plate 35 have a center bore 32, while the flange adapter part 7 is provided in the bore 32 with an internal threading 33, so that the clamping bolt 34 by means of a corresponding interference fit in the releasable plate 35 clamps the latter together with the adapter part 7. The inner bore of the clamping bolt 34 serves to receive the guide pin 2 of the plug piece 1, designed as the center lug. For the accurate machining of the bores 8 and the corresponding bores in the plate 35 with the conical entrances 11, it is necessary to connect these elements with each other unalterably by means of two locating pins 36 and 37 (See FIG. 4). These locating pins provide even after the machining of the bores in the ready-to-use state of the socket piece the connection between the releasable plate 35 with the flange adapter part 7. However, because the locating pins 36 and 37 are overdimensioned, the plate 35 cannot be immediately, i.e. without special assistance, released from the flange adapter part which in turn is necessary if the gaskets 12 located in the grooves 13 are to be replaced. This function is provided by a pull-off device formed by the clamping bolt 34 in cooperation with the lock washer 41 located in the groove of the hollow bolt 34 and the nose 38 with its shoulder 39. When the hollow bolt 34 is loosened, the lock washer 41 presses against the shoulder 39 of the nose 38 and thus releases the plate 35 from the flange adapter part 7, whereby the grooves 13 are exposed and the O-rings 12 may be replaced.

The bore 9 serves to receive the guide pin 3 of the plug piece 1 and in the bore 54 the locating pin 29 to connect with the spacer shell 30 is located. The spacer shell 30 is provided with bores 49 to receive the hose fittings 50. The front part of the fitting 50 carries a sealing ring 51, which in the bore 8 of the flange adapter part 7 provides adequate sealing.

The internal bore 10 of the clamping bolt 34 contains a pressure resistant seal 55. This assures that the central median lug 2, which in this case is designed both as a guide pin and as a pin of the hose fitting, effects a tight connection.

Figure 4:
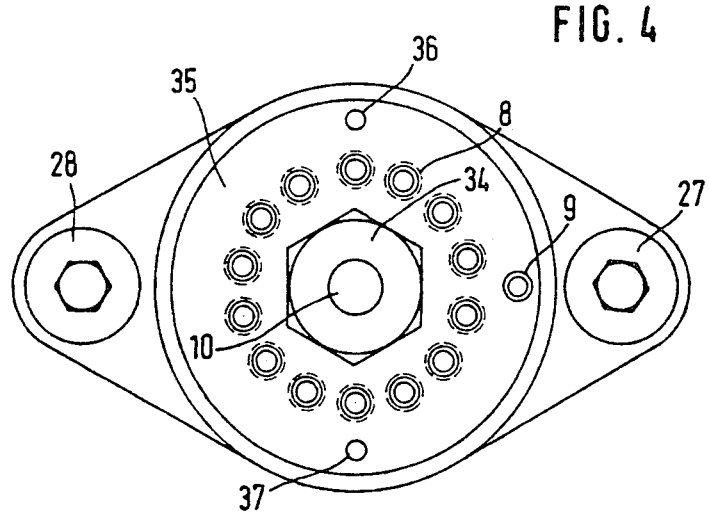
FIG. 4 a vertical top view of FIG. 3.

FIG. 4 shows a top view of FIG. 3, wherein in particular the spatial arrangement of the bores 8 in relation to the clamping bolt 34 and the bores for the locating pins 36 and 37 and also the bore 9 to receive the plug pin 3 of the plug piece 1 may be seen.

FIG. 5 shows a side elevation in partial section of the flange adapter part 7 released from the spacer shell 30 which in FIG. 6 is shown separately to illustrate the reception of the fittings 50. Each fitting 50 is provided with a collar 52 resting on the rim of the bore 49 of the spacer shell 30, while the movements of the fitting 50 from the bottom part of the spacer shell 30 are limited by the lock washer 53.

The plug coupler according to the present invention makes it possible to easily couple the plug piece with the socket piece, whereby during any number of repetitions, always a safe connection is established between pilot control lines with secure coordination of the individual pilot control lines and the sensitive pins of the hose fittings of the plug piece are arranged in a protected manner. The O-rings present in the socket piece may be replaced simply and the plug connection may be exposed to severe operating conditions without the need to compromise on the conditions required. By virtue of the pull-off device according to the invention, oversized locating pins may be used for the simultaneous production in the plate and the flange adapter part, so that extremely narrow clearances and very tight fits may be obtained. This considerably extends the life of the seals, because the sealing gap produced is dimensioned so that the gaskets cannot be driven into the gap by the high operating pressures and no damage occurs during the plug-in process. In spite of this, the specifications of DIN 7168 may still be observed in manufacturing.

We claim:

1. A hose coupling device for multiple hose connections requiring a tightly fitted hose fitting comprising:
    a plug portion having a support means with a plurality of bores;
    hose fitting means disposed within said plurality of bores;
    hose fitting pins extending from said hose fittings, and guide pin means;
    a socket portion consisting of a flange adaptor section and a spacer section;
    said flange adaptor section comprising
        a flange adaptor means having a plurality of bores containing replaceable gasket means positioned in a groove in each of said plurality of bores, and
        a releasable plate means connected to said flange adaptor means with a clamping bolt having a central bore receiving said guide pin means;
    said releasable plate means comprising a shoulder means releasably holding said releasable plate means to said flange adaptor means, a lock washer means cooperating with a groove in said clamping bolt, and a plurality of bores registering with said plurality of bores in said flange adaptor means for receiving said hose fitting pins;
    said spacer section having a shell means with a plurality of bores for registering with said flange adaptor section bores and means connecting said spacer section bores to said releasable plate means.

2. The hose coupling device of claim 1 wherein the support means of said plug portion also carries a median guide pin means.

3. The hose coupling device of claim 2 wherein said flange adaptor section further comprises a bore for receiving said median guide pin means.

4. The hose coupling device of claim 1 wherein the flange adaptor section has an internally threaded center bore for receiving said clamping bolt and wherein the releasable plate has a corresponding center bore for receiving said clamping bolt.

5. The hose coupling device of claim 1 wherein the clamping bolt, relesable plate means and flange adaptor means are releasably engaged for providing access to said replaceable gasket means.

6. The hose coupling device of claim 1 wherein the relesable plate means and the flange adaptor means are further fastened together by a plurality of locating pin means.

7. The hose coupling device of claim 6 wherein the locating pin means includes two oversize locating pins.

8. The hose coupling device of claim 1 wherein the plurality of bores in said releasable plate are conical in shape for receiving said hose fitting pins and wherein said hose fitting pins and wherein said flange adaptor means has a plurality of bores with an expanded groove portion, said flange adaptor means bores being in register with said releasable plate means bores.

9. The hose coupling device of claim 8 wherein each of said grooves carries an O-ring.

10. The hose coupling device of claim 2 wherein said releasable plate means and said flange adaptor means contain an eccentrically positioned bore for receiving said median guide pin.

11. The hose coupling device of claim 1 wherein the central bore of said clamping bolt contains a sealing means.

* * * * *